Aug. 17, 1943.   T. B. DALTON ET AL   2,326,931
APPARATUS FOR FORMING BAGS
Filed April 24, 1940   6 Sheets-Sheet 3

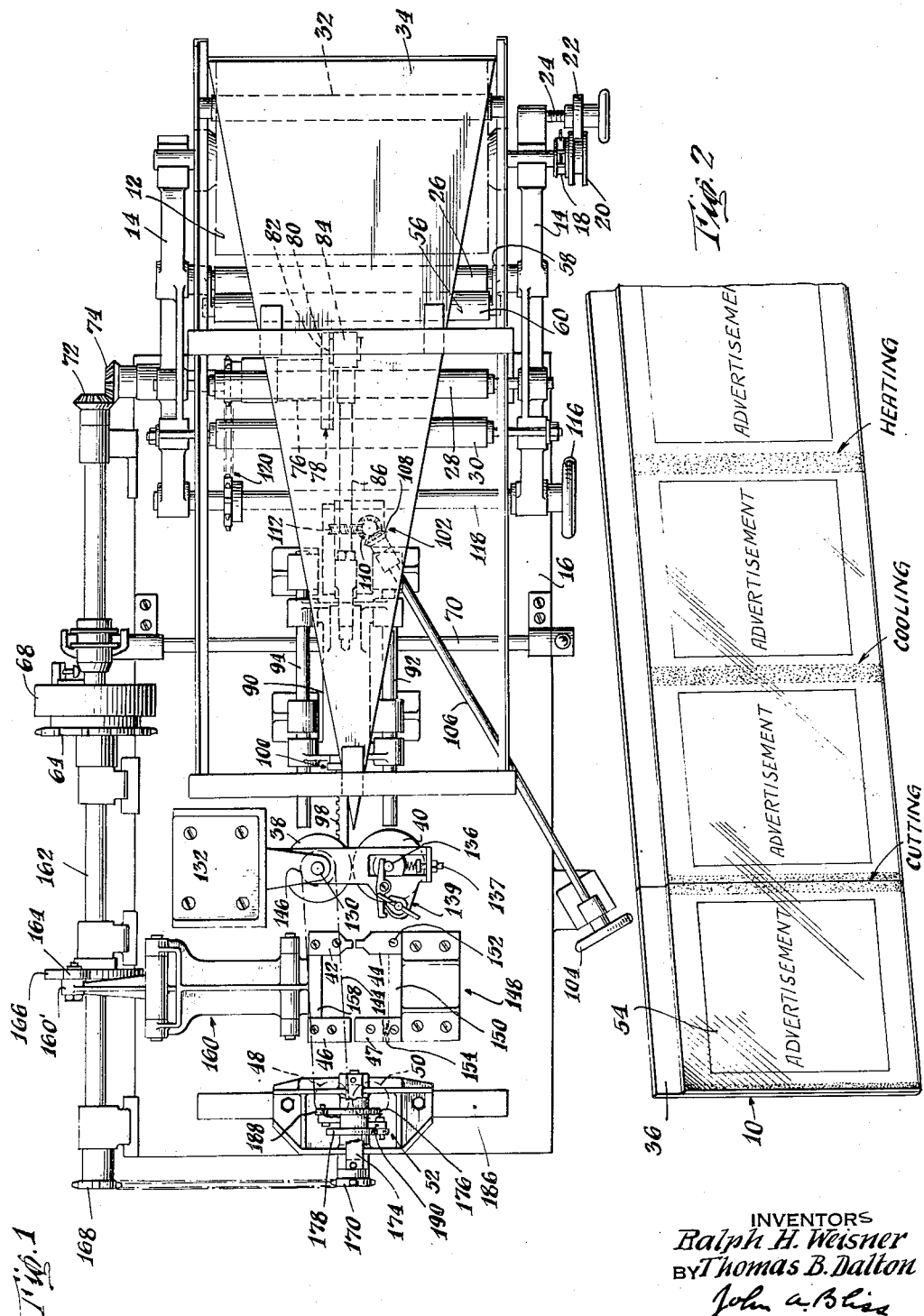

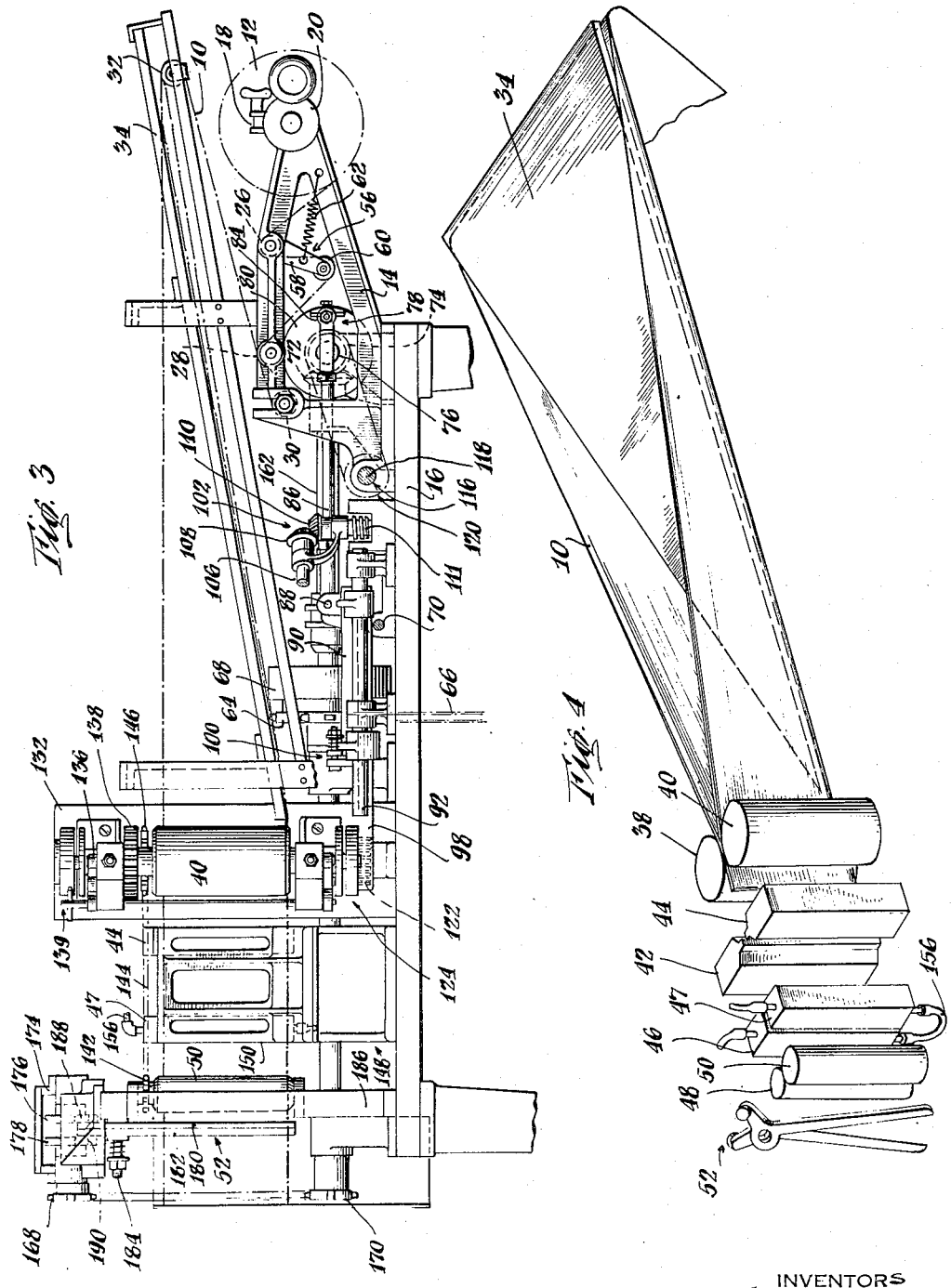

INVENTORS
Ralph H. Weisner
BY Thomas B. Dalton
John A. Blair
ATTORNEY

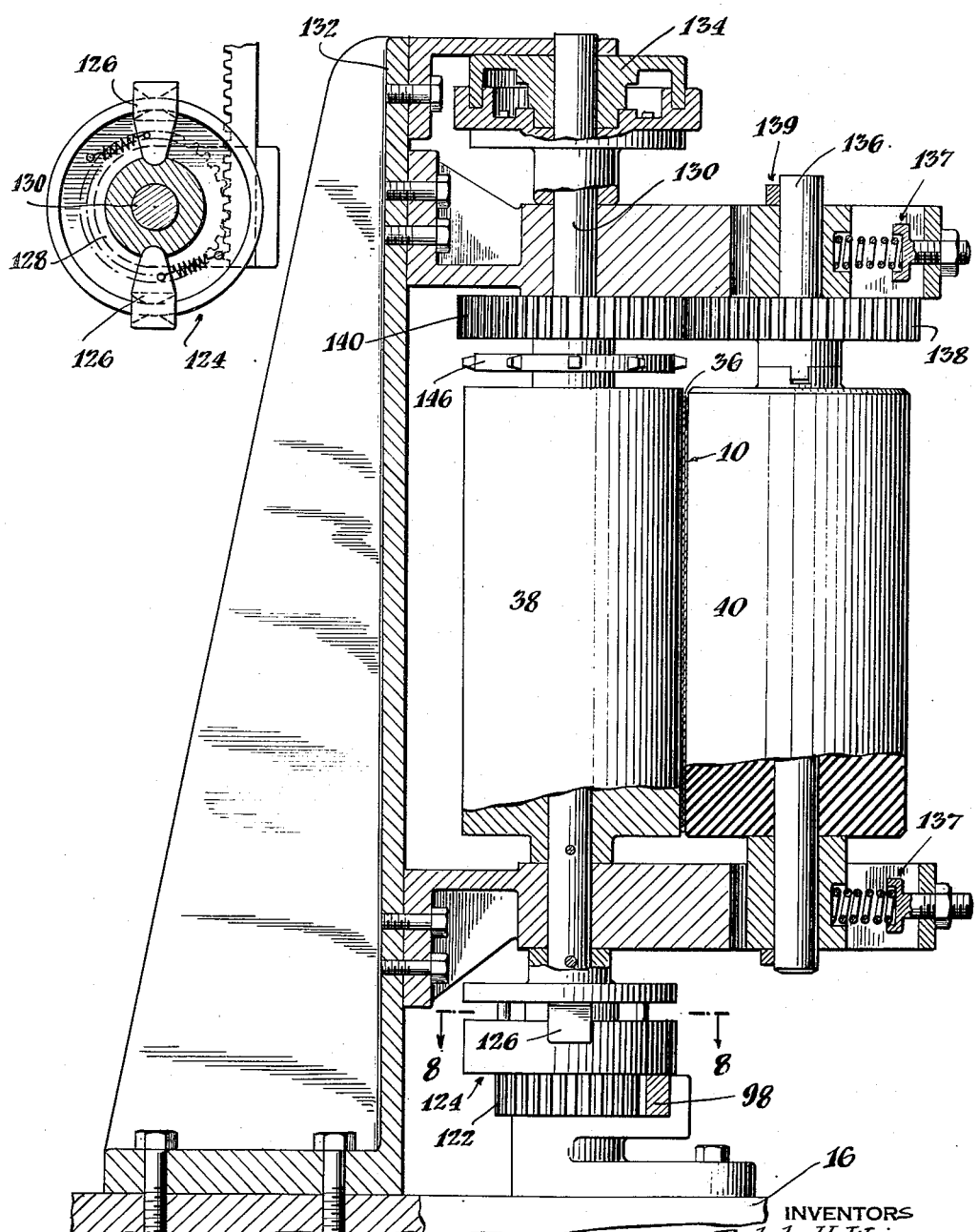

Aug. 17, 1943.     T. B. DALTON ET AL     2,326,931
APPARATUS FOR FORMING BAGS
Filed April 24, 1940     6 Sheets-Sheet 5
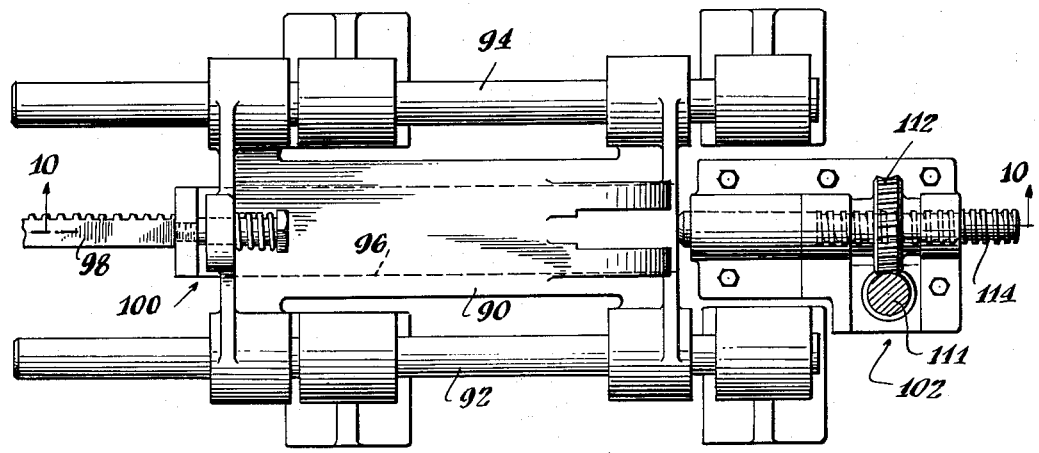
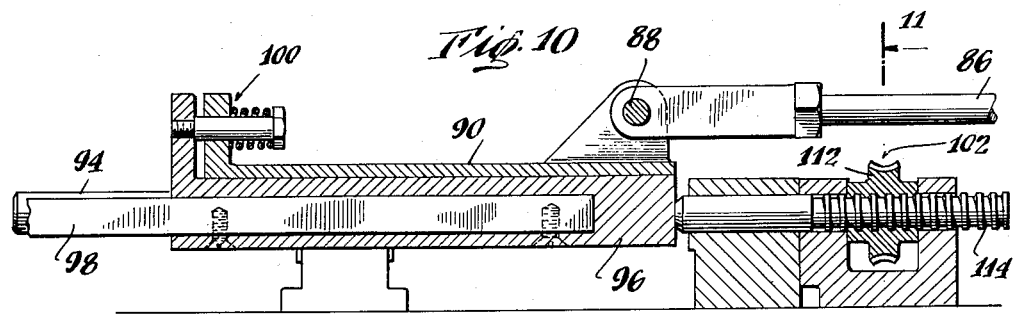
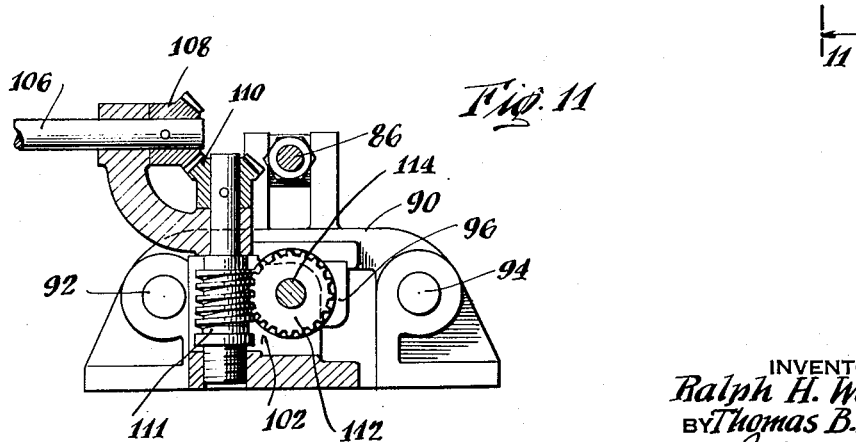
INVENTORS
Ralph H. Weisner
BY Thomas B. Dalton
ATTORNEY Aug. 17, 1943.  T. B. DALTON ET AL  2,326,931
APPARATUS FOR FORMING BAGS
Filed April 24, 1940  6 Sheets-Sheet 6
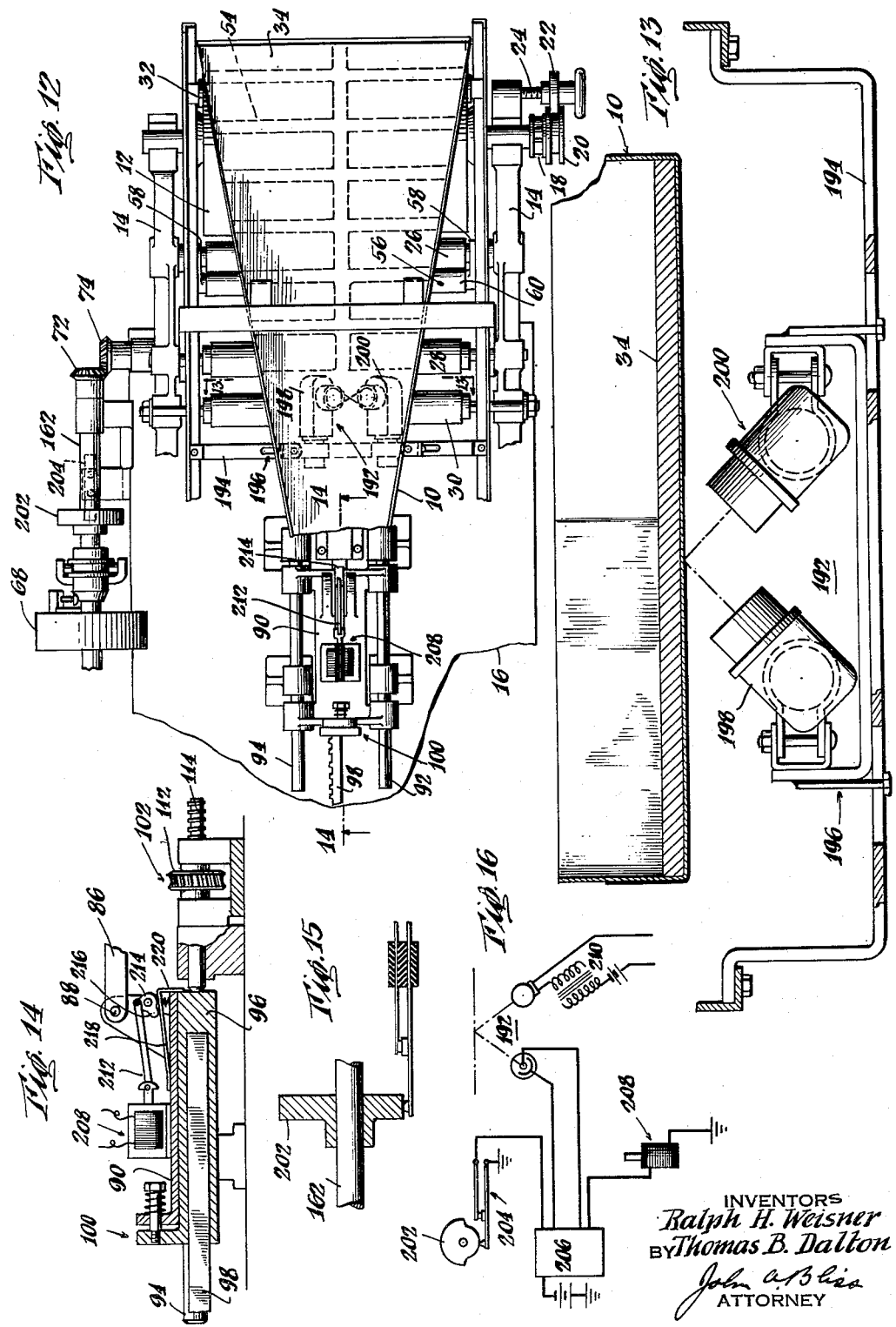
INVENTORS
Ralph H. Weisner
BY Thomas B. Dalton
ATTORNEY Patented Aug. 17, 1943

2,326,931

UNITED STATES PATENT OFFICE 2,326,931

APPARATUS FOR FORMING BAGS

Thomas B. Dalton and Ralph H. Weisner, Orange, N. J., assignors to Reynolds Metals Company, Richmond, Va., a corporation of Delaware Application April 24, 1940, Serial No. 331,340

6 Claims. (Cl. 93—8)

The present invention relates to improvements in the manufacture of bags, envelopes, or like containers, and more particularly to improved apparatus for the high speed production of open mouth bags in variable sizes from a single web of material having a heat-fusible surface, wherein the single stripe is folded upon itself and bags formed by successive longitudinal edge sealing, cooling, and cutting operations, and the invention primarily is directed to apparatus for the formation of metal foil bags having face to face longitudinal marginal seals wherein the metal foil stock has laminated thereto, or is coated with, a heat fusible sealing material adapted to strengthen the foil and to render the bag sift-proof, and impervious to air and moisture.

The present invention does not include any steps directed to sealing the bags or closing the open mouths of the bags after sealing, as these operations may be accomplished by conventional mechanisms.

In the art of manufacturing bags, it has been standard practice to form elongated bag tubes, cut into desired lengths and thereafter to form bags therefrom by sealing the bottoms, but at least with certain types of stock, the sealing of the bottom of the bag has presented serious difficulties.

Also, it has been standard practice to bring together two plies of heat fusible coated material into superimposed relation and to form longitudinal and transverse seal areas in the material by means of heating rollers, thereafter producing a bag by passing the stock between cut-off rolls to sever the material through the sealed areas. Such an operation produced a bag sealed along three edges by continuous operations; but at least with certain types of stock, imperfect edge seals resulted, because in an effort to attain speed, the bags were formed continuously, and the sealing rollers were permitted to contact the heat fusible stock for too short a period.

The prior art methods do not provide with a high speed production of bags with a folded bottom, having definite and positive longitudinal edge seals, nor is apparatus suggested which permits the production upon a single machine of a wide range of bag sizes, variable as to both width and height, and also variable as to a projecting lip portion at the mouths of the bag.

Accordingly, it is an object of our invention to provide a new apparatus for the manufacture of sift-proof, relatively air and water impervious bags or like containers, from a single web of material wherein the bottom of the bag is not sealed but is formed by a fold in the material and wherein the longitudinal side seams of the bag are formed by means of a face to face contact and seal of the heat fusible, lacquered or laminated stock.

Another object of our invention is to provide an apparatus for the manufacture of such containers which is adapted to advance the web intermittently, thereby allowing time for an efficient and positive sealing step and which is also adapted to maintain tension upon the web at all times during the forming operations, thereby permitting high speed intermittent operation.

Another object of our invention is the provision of a cooling means to cool the seal obtained by a heat sealing means, thereby also affording high speed operation.

Another object of our invention is the provision of apparatus for the manufacture of bags as described, which, by means of simple machine adjustments, permits the production, from one machine, of bags which vary in width and in height, and which also vary in the amount of projecting lip.

Another object of our invention is the provision of both manual and automatic registering mechanism for speeding up or retarding the feed of the web to successive sealing, cooling and cutting mechanism, thereby assuring, in any one production run of apparatus, bags of uniform size, with printed exteriors, having the printing in registered position.

It is a further object of our invention to provide a simple apparatus carrying out the above stated objects wherein the parts are so formed and associated and synchronized that high speed production of vast quantities of uniform bags is assured without machine difficulties or frequent attention by an operator.

These and other objects of our present invention will become more apparent from the following description taken in connection with the accompanying drawings, which latter are for purposes of illustration only and are not to be construed as limiting the invention or the apparatus which may be used therewith. In the drawings, like numerals refer to like parts throughout.

Referring to the drawings:

Fig. 1 is a plan view of the entire machine;

Fig. 2 is a perspective view of the web;

Fig. 3 is a front elevation of the machine;

Fig. 4 is a skeleton perspective of the feeding rolls; heat sealing and cooling and cutting units;

Fig. 7 is an enlarged vertical cross section through the feeding rolls;

Fig. 8 is a horizontal cross section on the line 8—8 of Fig. 7;

Fig. 9 is the top plan view of the web aligning device;

Fig. 10 is a section on the line 10—10 of the Fig. 9;

Fig. 11 is a section taken on the line 11—11 of the Fig. 10;

Fig. 12 is a fragmentary plan view of a portion of the machine showing a photo-electric cell energized solenoid and associated mechanism for control of the web feeding means;

Fig. 13 is a fragmentary section taken along the line 13—13 of the Fig. 12 showing the supporting means of the photo-electric cell and its positioning in respect to the web;

Fig. 14 is a section taken on a line 14—14 of Fig. 12;

Fig. 15 is a detailed section of a cam mounted upon the main driving shaft and a switch associated therewith for closing the photo-electric cell circuit.

Fig. 16 is an electrical diagram of the photo-electric circuit.

Figure 5:
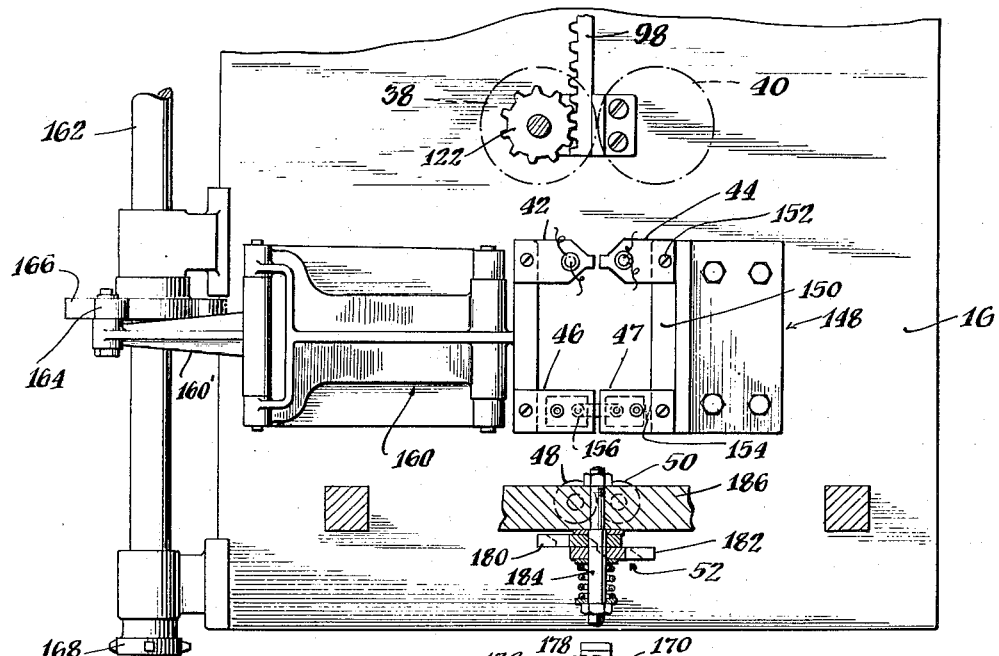
Fig. 5 is a fragmentary section taken on the line 5—5 of Fig. 6.

In these figures a bag forming web 10 is unwound from a web of material contained on roller 12 which latter is journaled in an extension bracket member 14 of the main frame 16 of the machine. The roller 12, as best illustrated in Figs. 1 and 3, is provided with a braking mechanism 18 and also a collar 20, with its cooperating flange 22 mounted upon stud 24 in order that the roller 12 is adjustable horizontally with relation to frame 16.

As indicated best in Fig. 3, the web 10 may be led over idler rollers 26, 28, 30, 32 to inclined forming table 34, which forming table places the web stock in face to face relation, and with one edge 36 of the material projecting beyond the other, if desired, as indicated at Fig. 2.

As will be easily understood, the horizontal position of the roller 12 in relation to the forming table 34 determines whether or not there will be a projecting edge 36, or lip, and the amount thereof is adjustable by lateral adjustment of roller 12. The web 10 is advanced from the forming table 34 to the feeding rolls 38 and 40 (see Fig. 4 for diagrammatic illustration) to the elongated heat sealing plates 42 and 44, to the cooling blocks 46 and 47, to the auxiliary feeding and tensioning rolls 48 and 50, and then to the cutting means 52.

It will be understood that the bag forming web 10 preferably comprises an outer layer of aluminum foil and an inner layer of heat fusible material such as rubber hydrochloride, commonly known as pliofilm, and that these two layers may be united by some suitable adhesive such as pliolite. A suitable web may be made of a lamination of .0006" aluminum foil united to a layer of .0014" rubber hydrochloride by means of .0002" "pliolite" adhesive.

Alternatively, the web 10 may be paper or any like material surface coated with any suitable heat fusible and heat sealing substance, as is well comprehended in the art, or the web might comprise heat fusible and sealing material alone, or alternatively a sheet of base material such as paper or metal foil coated with a heat fusible and heat sealing substance coated thereon in predetermined and defined stripes. It is also within the purview of this invention to have predetermined portions of the web 10 preprinted with an advertisement indicated as 54 in such manner that when the bags are formed, the advertisement will be in registered central position thereupon, and the means of registration therefor is an important feature of our invention.

As the web 10 is unwound from roller 12 over idler roll 26, it is led past a tension device 56 which comprises two arms 28 pivotedly supported in frame 16 and an idler roll 60 journaled in the lower ends of said arms together with a spring 62, whereby the tension member 56 is adapted to take up any slack in the web 10 between the stock unwind roller 12 and the main feeding rollers 38 and 40, which latter will normally be provided with rubber surfaces.

The driving mechanism of the machine will now be described: A main driving shaft 162 may be driven by means of sprocket 64 and chain 66 connected to a motor or other source of power (not shown), and main sprocket gear 64 will normally have associated therewith a friction clutch 68, as indicated, controlled by clutch rod 70. The clutching mechanism is regarded as conventional and so is not described in detail.

By means of beveled gears 72 and 74, shaft 76 is rotated. Associated with shaft 76 is an eccentric drive mechanism 78 which imparts intermittent forward movement to the web 10 and which includes a circular plate member 80 mounted upon shaft 76 with a slot 82 therein for holding a block 84 adjustable in said slot. Block 84 is connected with drive rod 86. Of course, the stroke of rod 86 may be adjusted by varying the position of block 84 in relation to the center of plate 80.

The eccentric drive rod 86 is pivotedly connected as at 88 to a yoke 90, which yoke is slidably mounted upon rods 92 and 94 and reciprocated forwardly and rearwardly thereon, as actuated by eccentric drive rod 86.

Slidably mounted within yoke 90 is block 96 which has connected thereto a rack 98, which rack forwardly drives main feed roll 38. Yoke 90 and slidable block 96 are connected to one another by means of the stud and spring assembly, identified generally as 100 and illustrated in Fig. 10, thereby permitting the yoke and the block to move substantially as a unit, but to have relative movement within the limits of the length of the stud and the strength of the spring in spring and stud assembly 100; this relative movement permits the adjusting of the forward drive of the yoke as imparted to the block. This adjustability factor is taken advantage of by means of hand controlled mechanism indicated generally as 102, whereby handle 104 may be used to rotate shaft 106, thus actuating bevel gears 108 and 110, threaded shaft 111 and gear 112 to advance or retract threaded rod 114, which latter bears against slidable block 96, if desired, to shorten its travel in relation to yoke 90, thus having the effect of cutting down the amount of forward movement of rack 98 in contrast with the stroke of eccentric rod 86.

A convenient feature included in the machine is a manual adjustment drive indicated generally as 116 which comprises hand operated shaft 118 connected by sprocket and a chain assembly 120 to shaft 76. This assembly permits hand feeding the web when the main drive shaft 162 is not driven by the motor or when the clutch mechanism 88 is thrown out.

The feeding roll 40 cooperates with driven main feed roll 38 and the latter is driven by rack 98 by means of its cooperating gear 122 only forwardly by means of conventional brake mechanism indicated generally at 124 (see detail in Fig. 8), and comprising spring actuated braking mechanism 126 operating in annular groove 128. The shaft 130 of main drive roll 38 will be positioned in suitable bracket mechanism 132 as shown, and if desired, the upper end of shaft 130 may also have a similar braking mechanism 134, as indicated, which is similar to braking mechanism 124, thus assuring no rearward slipping of web 10 when rack 98 is retracted.

As indicated best in Fig. 7, drive roll 40 cooperates with driven main roll 38, and its shaft 136 will spring tension towards shaft 130 of roll 38 by means of adjustable spring means indicated as 137, if desired. Also, as indicated, in Fig. 1, manually operable cam means identified generally as 139, may be provided to throw roll 40 outwardly so as to thread web 10, or stop its forward drive. As indicated, shaft 136 of roll 40 may be provided with a gear 138 driven by gear 140 mounted upon shaft 130.

Auxiliary feeding and tensioning rolls 48 and 50 are positioned forwardly of the cooling means 46 and may be driven by a sprocket 142 connected by a chain 144 to a sprocket 146 mounted upon shaft 130.

An important feature of my invention is the provision of a slight over drive to the auxiliary feeding and tensioning rolls 48 and 50 (by adjusting the size of the sprocket) which insures tension upon the web in its passage between main drive rolls 38 and 40 and auxiliary rolls 48 and 50, thus preventing any slack in the web during the important sealing and cooling steps. Rolls 48 and 50, of course, since they are over-driven, are tensioned against each other only slightly so that they allow the web to slip after the web is well tautened by the rolls 48 and 50 and rolls 38 and 40. Rolls 48 and 50 will normally be rubber coated.

Figure 6:
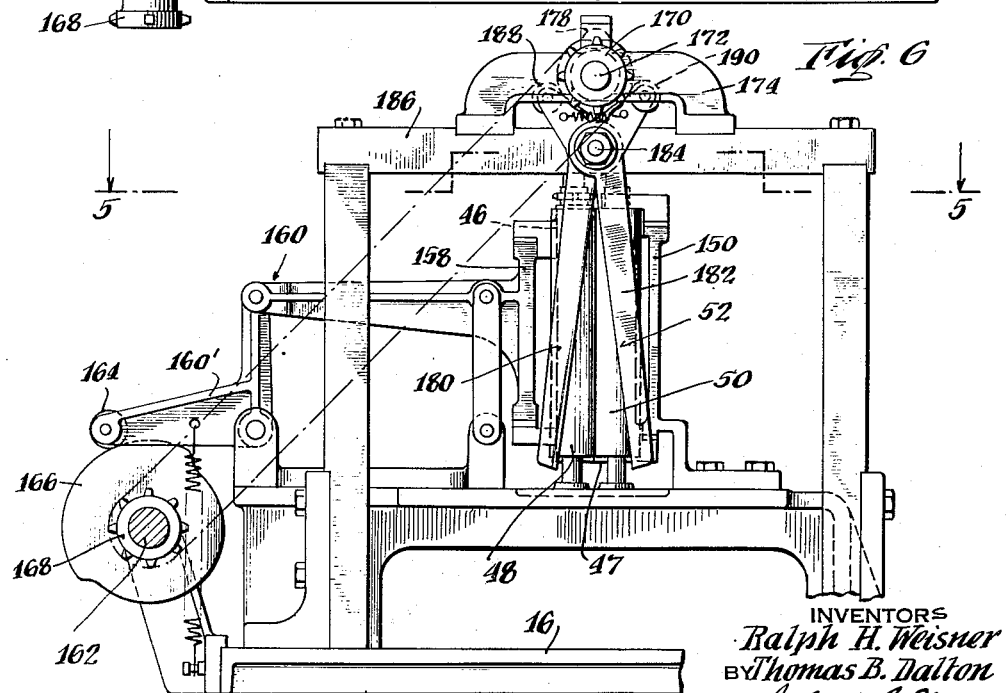
Fig. 6 is a fragmentary end elevation of the machine looking at the cutting end.

As best shown in Figs. 1, 5 and 6, a plate bracket mechanism 148, as illustrated, may be appropriately secured to the frame 16, and the elongated plate member 150 thereof is disposed longitudinally of the machine. Heating element 44 is positioned upon plate 150 and may be secured thereto by a set screw 152 in such manner as to permit the longitudinal adjustment of heating element 44; cooling block 47 is similarly positioned upon plate 150 and in an adjustable fixed position, and is indicated in Fig. 1, and may be arranged with a spring cushioning arrangement 154, if desired, to cushion the contact of its cooperating cooling element 46. The cooling blocks 46 and 47 have appropriate hose connections indicated generally as 156 for the circulation of a cooling medium such as water.

Cooperating with and in opposed relation to heating element 44 and cooling element 47 are provided heating element 42 and block 46 which are positioned upon and are longitudinally adjustable in respect to plate bracket member 158. The plate bracket member 158 is arranged to reciprocate to and from plate member 150 by means of a parallelogram mechanism of conventional design, which is identified generally as 160 and which includes bell crank arm 160' which latter is provided with an eccentrically mounted roller 164, a contacting cam 166 therefor, which latter cam is mounted upon main drive shaft 162.

Cam 166 will be so arranged as to actuate plate bracket member 158 centrally of the machine during periods when web 10 is at rest and feed rolls 38 and 40 are not being driven. If desired, the heating elements 42 and 44 may be electrically heated and thermostatically controlled (not shown) and together cooling blocks 46 and 47 will be so arranged in reference to reciprocating plate member 158 as to afford appropriate and desired sealing and cooling contacts.

The drive for the cutting means 52 is taken from main drive shaft 162 by means of a sprocket member 168, which chain drives sprocket member 170 which latter is mounted upon shaft 172. Shaft 172 is appropriately journaled in a bracket member 174. As seen by reference to Fig. 1 and Fig. 6, cam 176 and 178 revolves upon shaft 172 and are arranged to actuate shearing members 180 and 182 respectively, and shearing members 180 and 182 are respectively pivoted as at 184 to upper framing member 186, and furthermore, have at their upper ends rollers 188 and 190 respectively bearing against cams 176 and 178.

As stated, drive shaft 162 actuates cutting means 52 and the latter and its associated parts above described are arranged so as to cut web 10 when the same is at rest. The machine is preferably arranged so that there is one cutting movement after each forward movement of the rack 98, and the heating and cooling means will also be arranged to operate simultaneously with the cutting operation.

The cutting means 52 will be arranged to cut centrally of a relatively wide seal strip upon web 10, as indicated in Fig. 2, and it will, therefore, be realized that according to our invention, each sealing contact of sealing element 42 and 44 seals one longitudinal edge of two bags ultimately formed.

By this arrangement of parts and by means of keeping the cutting operation constant, the width of the bags may be varied by the amount of intermittent feed of the web 10, and by appropriate positioning of the longitudinally adjustable heat and cooling means. The height of the bags varies in accordance with the width of web 10 within the limitations of the processing stations above described. A wide margin of adjustability for the widths of the bag is derived from the eccentric drive mechanism 78, as well as the subsidiary hand controlled forward drive adjustment mechanism 102.

If the web 10 is preprinted with advertisements 54, which will be centrally located upon the bags, as indicated in Fig. 2 or other indicia, we provide automatic photo-electric cell control adjusting means indicated generally as 192 for the automatic registration of the printing by means of a control of the intermittent web advance.

A suitable bracket 194 is positioned beneath forming table 34 and underneath web 10 and has adjustable support means 196 for photo-electric cell 198 and a light means 200 which latter members are so associated as to permit a light beam to emanate from light source 200 to reflect against the bright metal foil area adjacent the printed surface of the web, as indicated, and to actuate the sensitised photo-electric cell mechanism 196; if the light beam is on the printed material, the photo-electric cell is so arranged as not to be affected. By means of a cam 202 upon main drive shaft 162, the electric circuit of the photo-electric cell 198 is only closed when the web is at rest. The circuit of the photo-electric cell includes a cam operated switch 204, a conventional control box 206, a solenoid 208 energized by the photo-electric cell, and a transformer 210.

The solenoid 208 is mounted upon yoke 90 and is so arranged that when actuated, a rod 212 is drawn towards solenoid 208. Rod 212 is pivoted eccentrically upon roller 214 which is provided with cam face 216. Cam face 216 actuates an upwardly spring tensioned member 218 which latter is positioned upon yoke 90. Member 218 has a depending metal strip flange 220 which may be about .025" in thickness, and these parts are so arranged that when the solenoid is energized, flange member 220 is thrust downwardly between the block 96 and threaded rod 114, thereby decreasing the amount of feed of the web by .025". This operation is repeated until proper registry is restored. Ordinarily, for example, we arrange the eccentric drive mechanism so that there is a slight overfeed of web 10, to the extent of .010" and accordingly, (depending upon the accuracy of the machine), after each three or four intermittent advances of the web, the automatic web registry means operates and cuts down the forward movement of the web by approximately .025".

It is also within the purview of our invention to include, additionally, in the machine above described, one or more opposed pairs of heat elements, and if desired, cooperating cooling elements in such fashion that bags are formed having two or more pockets therein separated by a sealed strip.

An important practical working advantage of the machine above described is that the bags are formed in up-right position with the open mouth on top; this is contrary to the usual flat bag-forming methods, and permits auxiliary bag filling and sealing machinery to be located directly adjacent to the cutting means and it is within the purview of our invention to include mechanical spring fingers or other gripping means to advance the bags, as formed, from the cutting station, directly filling the same by conventional filling apparatus and thereafter seal the top of the filled bags by a conventional hot plate mechanism, and the advantages of such simplified forming, filling and sealing mechanism will be readily recognized by those skilled in the art.

It will be realized that our invention essentially relates to a high speed apparatus adapted for the formation of variable sized bags, and that the apparatus includes means for intermittently feeding the web, thereby assuring sufficient time for positive and efficient heat sealing operations, and that the heat seals effectuated by such heat sealing operations are preferably cooled by cooling means in order that the cutting operation may be accomplished at an increased speed.

It will be further realized that certain elements described in the illustrative form of our invention may be replaced by other elements either in whole or in part, and that certain steps described may be alternated or replaced by other equivalent steps in whole or in part, and that, therefore, the scope of our invention is limited only as defined in the appended claims.

We claim:

1. In a machine for continuously forming open mouth bags having folded seamless bottoms and heat sealed edges from a single web of material having a heat fusible surface, the combination which includes a web retaining roller, adjustable and resilient means for intermittently withdrawing said web from said roller, means for folding the web longitudinally so that portions of the web are in unsealed face to face relation, automatic means cooperating with said resilient means for varying the amount of the feed of the web, heating means to form sealed stripes transversely of the folded web, and separate cutting means arranged to cut the web centrally of said sealed stripes, thereby forming open mouth bags with said open mouths all facing in the same direction.

2. In a machine for continuously forming open mouth bags having folded seamless bottoms and heat sealed edges from a single web of material having a heat fusible surface, the combination of an unwind mechanism for the web, means for adjustably advancing the web intermittently, heating, cooling, and cutting means adapted for simultaneously sealing, cooling and cutting the web during periods when the web is at rest, said means for adjustably advancing the web including main feed rolls, a yoke and sliding block arranged to move substantially in unison but to have an adjustable relative movement, an adjustable eccentric drive mechanism for reciprocating said yoke, a rack and gear means for driving said feed rolls connected to said block, and fine adjustment means for adjusting the relative positions of said yoke and block.

3. In a machine for continuously forming open mouth bags having folded seamless bottoms and heat sealed edges from a single web of material having a heat fusible surface, the combination of an unwind mechanism for the web, means for adjustably advancing the web intermittently and maintaining the same under tension, heating, cooling, and cutting means adapted for simultaneously sealing, cooling and cutting the web during periods when the web is at rest, said means for adjustably advancing the web and maintaining the same under tension, including main feed rolls, a yoke and sliding block arranged to move substantially in unison but to have an adjustable relative movement, an eccentric drive mechanism for reciprocating said yoke, a rack and gear means for driving said feed rolls connected to said block, fine adjustment means for adjusting the relative positions of said yoke and block, and auxiliary feed rolls positioned between the cooling and cutting means adapted to slightly over-feed the web as compared to said main feed means, thereby maintaining the web under tension.

4. In a machine for continuously forming open mouthed bags having folded seamless edges from a single web of material having a heat fusible surface, the combination which includes a web-retaining roller, means for intermittently withdrawing predetermined lengths of said web from said roller including a feed roller, a reciprocable device for imparting movements to said feed roller, an actuated carrier for said reciprocable device, the latter being slidable in the carrier, yieldable means intermediate the reciprocable device and the carrier and means for relatively moving the reciprocable device and the carrier preliminary to an active stroke of the latter, heating means to form sealed strip-like areas transversely of the folded web and separate cutting means adapted to cut the web centrally of said sealed strip, thereby forming open mouthed bags with the open bags all facing the same direction.

5. In a machine for continuously forming open mouthed bags having folded seamless edges from a single web of material having a heat fusible surface, the combination which includes a web-retaining roller, means for intermittently withdrawing predetermined lengths of said web from said roller including a feed roller, a reciprocable device for imparting movements to said feed roller, an actuated carrier for said reciprocable device, the latter being slidable in the carrier, yieldable means intermediate the reciprocable device and the carrier and means for relatively moving the reciprocable device and the carrier preliminary to an active stroke of the latter, heating means to form sealed strip-like areas transversely of the folded web, cooling means to cool the heat sealed strip areas, and separate cutting means adapted to cut the web centrally of the said sealed strip, thereby forming open mouthed bags with the open bags all facing the same direction.

6. In a machine for continuously forming open mouthed bags having folded seamless edges from a single web of material having a heat fusible surface, means for folding the web longitudinally so that portions of the web are in unsealed face-to-face relation, heating means to form sealed strip areas transversely of the folded web, and means for intermittently feeding said web from said roller which comprises a feed roller, and reciprocable driving means for said roller, said last named means comprising two relatively slidable members, the first member receiving a power stroke for delivery to the feed roller and the second member transmitting a power stroke from a source of power to the second member, a yielding connection intermediate said two members, and an adjustable stop device for limiting the movement of one of the members in a given direction whilst permitting continued movement of the second member in that direction.

RALPH H. WEISNER.
THOMAS B. DALTON.